United States Patent
Stephens, Sr. et al.

(10) Patent No.: US 6,356,580 B1
(45) Date of Patent: Mar. 12, 2002

(54) DIRECT SEQUENCE SPREAD SPECTRUM USING NON-ANTIPODAL PHASE SHIFT KEYING

(75) Inventors: James P. Stephens, Sr., Bellbrook; Robert S. Parks, Fairborn, both of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/348,740

(22) Filed: Jul. 6, 1999

(51) Int. Cl.$^7$ ................................................ A61F 2/06
(52) U.S. Cl. ................................................ 375/141
(58) Field of Search ................................. 375/141, 145, 375/146, 147, 149, 367

(56) References Cited

U.S. PATENT DOCUMENTS

| | | | |
|---|---|---|---|
| 4,998,261 A | | 3/1991 | Van Driest et al. .............. 375/1 |
| 5,341,396 A | | 8/1994 | Higgins et al. .................. 375/1 |
| 5,799,035 A | | 8/1998 | Lattard et al. ................ 375/206 |
| 5,938,787 A | * | 8/1999 | Stark ........................... 714/755 |
| 6,075,812 A | * | 6/2000 | Cafarella et al. ............ 375/141 |
| 6,078,573 A | * | 6/2000 | Matalama et al. ........... 370/335 |
| 6,233,271 B1 | * | 5/2001 | Jones et al. ................. 375/142 |

* cited by examiner

Primary Examiner—Don N. Vo
(74) Attorney, Agent, or Firm—Gina S. Tollefson; Gerald B. Hollins; Thomas L. Kundert

(57) ABSTRACT

A reception simplified, reduced cost spread spectrum transceiver device and method. The transmitting portion of the transceiver antipodally modulates a pseudorandom code and non-antipodally modulates binary bit data onto a carrier wave. The receiving portion of the transceiver performs a mathematical squaring function on the received signal combination of pseudorandom code and data. Squaring the pseudorandom code results in a cancellation of the code and the data remains in the absence of the pseudorandom code. The device and method of the invention eliminates the need for storing or generating a local reference for the spreading code or the need for any knowledge of key signal parameters at the receiver greatly simplifying receiver circuitry and allowing receiver operation at low energy density and low operational cost. Additionally, the device and method of the invention eliminates the synchronization constraint between the transmitted data and spreading code of conventional systems.

14 Claims, 4 Drawing Sheets

DIRECT SEQUENCE SPREAD SPECTRUM USING NON-ANTIPODAL PHASE SHIFT KEYING

RIGHTS OF THE GOVERNMENT

The invention described herein may be manufactured and used by or for the Government of the United States for all governmental purposes without the payment of any royalty.

BACKGROUND OF THE INVENTION

The present invention relates to the field of spread spectrum communications and more particularly to direct sequence spread spectrum transceivers.

Spread spectrum refers to a type of signal modulation in which the bandwidth required for transmission greatly exceeds the information bandwidth. Motivation for spread spectrum signals is based on the following: (1) the ability to reject intentional and unintentional jamming by interfering signals so that information can be communicated; (2) low probability of interception or detection since the power in the transmitted wave is "spread" over a large bandwidth or frequency extent; (3) message privacy since the signals cannot be readily demodulated without knowledge of the code; (4) tolerance of multipath reception; and (5) the ability to send many independent signals over the same frequency band.

One generic type of spread spectrum signal and the most often used is a direct sequence spread spectrum (DSSS) signal. In direct sequence modulation, each bit of an information-bearing signal, the information desired to be transmitted which is inherently random or at least unknown to the receiver and contains the information to be communicated bit by bit, is modulated by a higher frequency, pseudorandom code signal. Direct-sequence spread spectrum is commonly achieved by directly modulating a carrier with a high rate digital pseudorandom spreading code. For example, digital data at a much lower rate is modulo-2 added to a pseudorandom code. Modulo-2 addition uses symbols consisting of 0 or 1 and is equivalent to multiplication with symbols consisting of ±1's. Both the data and the pseudorandom code are multiplied by a carrier. This modulation method is often referred to as phase shift keying because the multiplication of data, code and carrier result in shifts of the carrier by 180 degrees. A bit value of one produces no phase shift and a bit value of minus one produces a 180 degree phase shift.

A generic DSSS signal can be represented as $$s_i(t)=\cos(\omega_0 t+d_i(t)+m(t)) \tag{Eq. 1}$$

where $\omega_0$ is the carrier frequency, $d_i(t)$ is the phase modulation due to a set of i data symbols, and m(t) is the phase modulation due to the spreading sequence. For conventional binary phase shift keying DSSS signaling this may be simplified to $$s_i(t)=d_i(t)m(t)\cos(\omega_0 t). \tag{Eq. 2}$$

Now $d_i(t)$ represents the data waveform consisting of the binary symbols ±1, and m(t) represents the pseudorandom code also consisting of the binary symbols ±1. For binary phase shift keying signaling, the combination of code modulo-2 added with data will produce 1 of 2 symbols:

$$s_1(t)=\cos(\omega_0 t) \tag{Eq. 3}$$

$$s_2(t)=\cos(\omega_0 + \pi) \tag{Eq. 4}$$

These waveforms are called 'antipodal' signals since $s_1(t)=-s_2(t)$. This is shown vectorially in FIG. 1. FIG. 1 shows an I or inphase-axis at 102 and a Q or quadature phase-axis at 101. The signals $s_1(t)$ and $s_2(t)$, respectively are shown along the positive inphase-axis at 103 and the negative inphase-axis at 100. The signals are antipodal by virtue of the fact that they are of equal magnitude and are 180 degrees apart in phase.

If the signal $s_i(t)$ is squared, which is done when a simplified receiver is used, as is described below, and the trigonometric identity $\cos^2\alpha=½+½\cos 2\alpha$ is applied, the following results:

$$[s_i(t)]^2=d_i^2(t)m^2(t)\cos^2(\omega_0 t) \tag{Eq. 5}$$

then, for i=1 or 2 for binary signaling as in (3) and (4) above, $$s_1^2(t)=\cos^2(\omega_0 t+\pi)=½+½\cos(2\omega_0 t), \tag{Eq. 6}$$

and $$s_2^2(t)=\cos^2(\omega_0 t)=½+½\cos(2\omega_0 t). \tag{Eq. 7}$$

The result is a direct current component and a sinusoid at twice the carrier frequency, reduced by 3 dB. A power reduction of ½ results in a 3 dB loss. That is, 10 log(½)=−3.01 dB. The resulting waveform is devoid of both pseudorandom code and data components. This is a commonly known result of squaring binary phase shift keying antipodal signals. Traditional DSSS receivers, therefore, have not employed a mathematical squaring operation at the receiver because the antipodally modulated data would be eliminated in such operation.

FIGS. 2 and 3 show generally prior art arrangements of a DSSS transmitter and receiver, respectively. The transmitter of FIG. 2 shows a binary bit data sequence 200, a pseudorandom spreading code 201 both combined by a mixer 202. The signal is then modulated using a binary phase shift keying modulator 203 onto a carrier wave 204. The signal is then transmitted at 205. The prior art receiver of FIG. 3 receives the signal at 301. Using a stored reference, the pseudorandom code at 303 is eliminated by the mixer 302 and the transmitted data signal is recovered and then demodulated using a binary phase shift keying demodulator 304. The binary bit data signal is then outputted at 305 to be used in the specific application.

In traditional DSSS systems, for the receiver to function, a replica of the pseudorandom code must be generated in the receiver and must be brought into time and frequency alignment with the transmitted pseudorandom code. High implementation costs are associated with such receivers. A squaring loop is then used to recover the carrier while a parallel path retains the data for coherent demodulation. Their function is to track the carrier and thereby allow phase-coherent demodulation of the data, that is, multiplication by a signal exactly in phase with the received carrier.

One of the disadvantages of using DSSS is the cost of implementation due primarily to the difficulty in achieving synchronization with the high rate pseudorandom spreading sequence. Despreading of a DSSS signal without knowledge of the pseudonoise (pseudorandom) spreading sequence or code synchronization has been previously described by a technique known as "blind despreading". This is achieved with knowledge of key signal parameters by either the "autocorrelation" or "cyclic autocorrelation" methods.

The present invention provides a method and device for blind despreading that requires only knowledge of carrier frequency and signal rate and is made possible by the use of novel non-antipodal phase shift keying phase modulation. This provides the advantages of both low energy density and low implementation costs. Low energy density is useful for applications such as space based systems that are required to maintain low power spectral densities on earth to reduce co-channel interference and to satisfy regulatory constraints. Implementation costs may be significantly lowered since this technique requires no embedded reference code or synchronization at the receiver. This suggests a variety of wireless applications where the advantages of spread spectrum modulation are desired and where numerous low cost receivers are required such as for computer local area networks (LAN), emergency alerting devices, and space-based broadcast systems of all types.

SUMMARY OF THE INVENTION

The present invention comprises a reception simplified, reduced cost direct sequence spread spectrum transceiver device and method. The transmitting portion of the transceiver antipodally modulates the pseudorandom code and non-antipodally modulates the data onto a carrier wave. The receiving portion of the transceiver performs a mathematical squaring function on the received signal combination of pseudorandom code and data. Squaring the pseudorandom code removes the code with the data remaining in the absence of the pseudorandom code. The device and method of the invention eliminates the need for storing or generating a local reference for the spreading code or the need for any knowledge of specific signal parameters at the receiver, greatly simplifying receiver circuitry. Additionally, the device and method of the invention eliminates the synchronization constraint between the transmitted data and spreading code of conventional systems allowing receiver operation at low energy density in receiver apparatus and low operational cost.

It is therefore an object of the present invention to provide a reduced cost spread spectrum transceiver device and method that provides simplified reception.

It is another object of the invention to provide a spread spectrum transceiver device operable in the absence of a stored reference at the receiver.

It is another object of the invention to provide a spread spectrum transceiver device operable in the absence of specific signal parameter knowledge at the receiver.

It is another object of the invention to provide a spread spectrum transceiver device and method employing non-antipodal phase shift keying modulation.

It is another object of the invention to provide a spread spectrum transceiver device and method for that allows for M-ary phase modulation data schemes.

It is another object of the invention to provide a spread spectrum transceiver device and method that eliminates the synchronization constraint between data and spreading code of conventional spread spectrum systems.

It is another object of the invention to provide a spread spectrum transceiver device and method that has a lower energy density in receiver apparatus than conventional systems and can be implemented at lower cost.

These and other objects of the invention are described in the description, claims and accompanying drawings and are achieved by a despreading simplified, receiver circuitry-minimized direct sequence spread spectrum transceiver device comprising:

a binary bit data interfacing circuit;

a binary bit pseuodrandom code generating circuit;

a non-antipodal modulation preprogrammable digital synthesis phase modulating device communicating with said binary bit data interfacing circuit and outputting a binary bit data sequence of preselected frequency;

a binary bit pseudorandom code and binary bit data sequence mixing device, said output of said mixing device modulated onto a spread spectrum carrier wave;

an operator determinative frequency translating circuit communicating with said mixing device;

a mathematical squaring function spread spectrum receiving circuit, said receiving circuit receiving output from said operator determinative frequency translating circuit and performing a mathematical squaring function thereon, said squaring function eliminating said binary bit psuedorandom code and preserving said binary bit data sequence; and said mathematical squaring function capability receiving circuit including an operator determinative binary bit data demodulating circuit.

DETAILED DESCRIPTION

The direct sequence spread spectrum transceiver device and method of the invention eliminates the need for a stored reference or the need for knowledge of key signal parameters at the receiver, greatly simplifying spread spectrum receiver circuitry and thereby allowing receiver operation at low energy density and low operational cost. The basic components of the transceiver include a source for a binary bit data sequence such as a computer, a pseudorandom spreading code generator, means for non-antipodally modulating the transmitted data sequence, a mixer for combining the modulated data sequence and pseudorandom code onto a carrier sequence or wave, and a filter for eliminating unwanted signal artifacts. Finally, the transceiver includes a receiver for receiving the transmitted signal, performing a mathematical squaring function on the received signal and means for demodulating the recovered data sequence.

A binary bit data sequence or signal comprised of 0's and 1's is outputted by a computer or other data source. In order to transmit as a direct sequence spread spectrum signal the signal must be modulated and spread. In conventional analog systems modulation of both the data and pseudorandom code is generally accomplished by binary phase shift keying or antipodal phase modulation. That is, the phase is modulated in increments of 180 degrees (a mathematical squaring would eliminate all the data and code). In conventional systems, binary phase shift keying is accomplished using a double balance mixer. A double balance mixer is an analog-based operating device and has the capability to modulate, or change the phase of a signal by 180 degrees. A receiver receiving such a modulated signal requires specific knowledge of the data signal being transmitted in order to despread the data signal.

In contrast to conventional systems, a significant aspect of the present invention is directed to accomplishing phase shift keying of a binary bit data signal using a digital synthesis device. One such device is manufactured by Analog Devices, part number AD9850. A direct digital synthesis device operates by programming a preselected length of binary bit words into the device which in turn outputs desired frequency. The AD9850 and other similar devices permit the selection of incremental phase values. The AD9850 allows increments of 180 degrees, 90 degrees, 45 degrees, 22.5 degrees and 11.25 degrees and any combination thereof. Other devices may permit finer resolution or a direct digital synthesis device could be designed to produce a specific resolution. The structure and characteristics of a digital synthesis device are well known to those skilled in the art.

Figure 11:
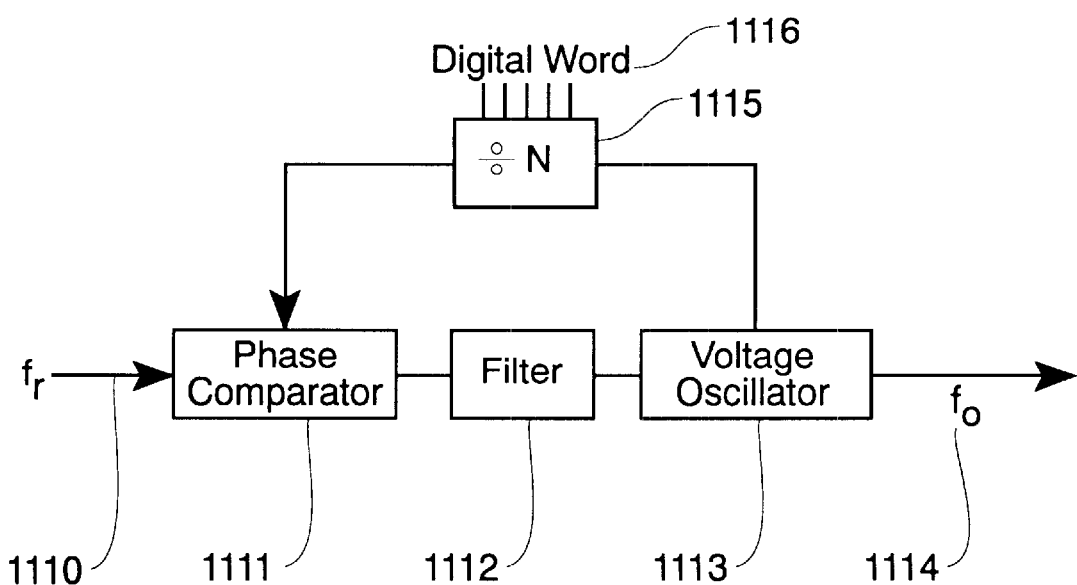
FIG. 11 shows a possible circuit arrangement for a digital synthesis device.

FIG. 11 illustrates a possible circuit arrangement for a direct digital synthesis device. The direct digital synthesis device of FIG. 11 comprises a phase comparator at 1111, a filter at 1112, a voltage oscillator at 1113 and a component for varying phase at 1115. Generally, the circuit of FIG. 11 is a closed loop system that compares the phase of two signals. The reference frequency signal at 1110 enters the phase comparator 1111, the signal is filtered at 1112 and then actuates a voltage oscillator 1113. A pre-programmed digital, binary bit word 1116 of preselected length varies the phase of the signal until an acceptable variation is achieved and the signal of desired frequency $f_o$ at 1114 is output.

Use of a digital synthesis device in the transceiver of the present invention is significant due to its capability to modulate signals in incremental phase values, or in other words, modulate non-antipodally in increments other than 180 degrees. Phase modulation from a direct digital synthesis device is non-antipodal, meaning the phase modulated signals do not cancel each other out when squared. This allows the phase modulated signal to be despread at the receiver by a mathematical squaring operation which retains the data and eliminates the pseudorandom code. Recovering the transmitted data by a simple squaring operation eliminates the need for a stored reference and other key signal parameters at the receiver.

To appreciate non-antipodal phase shift keying modulation as used in the present invention, consider binary symbols and let $d_i(t)$, be a phase modulation signal due to a set of data symbols as used in Eq. 1, let $d_i(t) \in \{\pi/4, -\pi/4\}$, or equivalently $d(t) \pi/4$, where $d(t)$ is $\pm 1$. With $m(t)$ being pseudorandom code as in Eq. 2 the signal may now be written as $$s_i(t) = m(t)\cos(\omega_0 t + d(t)\pi/4). \quad \text{(Eq. 8)}$$

This results in quaduature phase components:

$$s_1(t) = \cos(\omega_0 t + \pi/4) \text{ for } m(t) = d(t) = 1 \quad \text{(Eq. 9)}$$

$$s_2(t) = \cos(\omega_0 t - 3\pi/4) \text{ for } m(t) = -1 \text{ and } d(t) = \quad \text{(Eq. 10)}$$

$$s_3(t) = \cos(\omega_0 t + \pi/4) \text{ for } m(t) = 1 \text{ and } d(t) = -1 \quad \text{(Eq. 11)}$$

$$s_4(t) = \cos(\omega_0 t + 3\pi/4) \text{ for } m(t) = d(t) = -1. \quad \text{(Eq. 12)}$$

Figure 10:
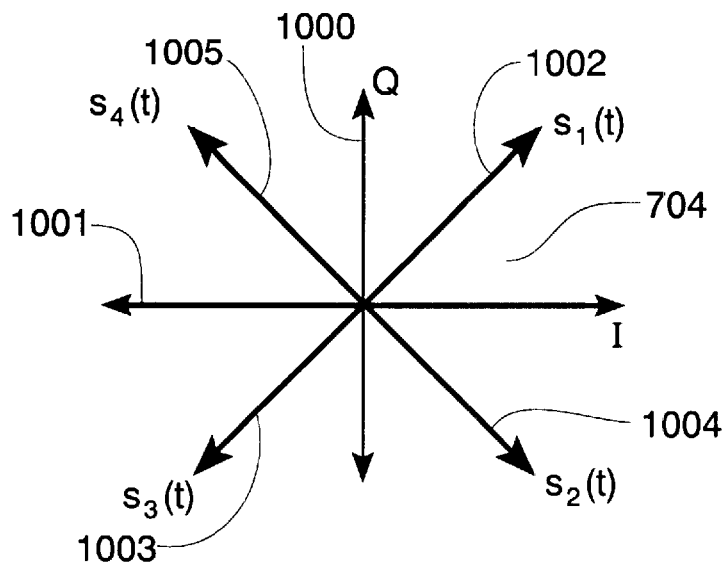
FIG. 10 shows a mathematical vector relationship of non-antipodal signals.

FIG. 10 shows the vector relationship of signals represented mathematically by Equations 9–12 phase shifted non-antipodally. The Q or quadature phase axis is shown at 1000 and the I or inphase axis is shown at 1001. The vector representation of the signal of Eq. 9 is shown at 1002 in FIG. 10, the signal of Eq. 10 is shown at 1004, the signal of Eq. 11 is shown at 1003, and the signal represented by Eq. 12 is shown at 1005. Notice that the signal $s_1(t)$ at 1002 and the signal $s_3(t)$ at 1003 are antipodal since $s_1(t) = -s_3(t)$. Similarly, signal $s_2(t)$ at 1004 and $s_4(t)$ at 1005 are antipodal since $s_2(t) = -s_4(t)$. This phase relationship is referred to as quadrature waveform. Squaring the quadrature waveform signals produces, $$s_1^2(t) = s_2^2(t) = \cos^2(\omega_0 t + \pi/4) = \tfrac{1}{2} + \tfrac{1}{2}\cos(2\omega_0 t + \pi/2) \quad (13)$$

$$s_3^2(t) = s_4^2(t) = \cos^2(\omega_0 t - \pi/4) = \tfrac{1}{2} + \tfrac{1}{2}\cos(2\omega_0 t - \pi/2). \quad (14)$$

The result now is a direct current component, a sinusoid at twice the carrier frequency reduced by half, and data keying the carrier phase $\pm\pi/2$. The pseudorandom code has been removed since it gave rise to keying between $s_1$ and $s_3$ and between $s_2$ and $s_4$, which are found to overlap when squared. In contrast, in a conventional system the signals would be antipodally modulated, that is, they would be shifted by 180 degrees and application of a squaring operation would result in masking the code due to overlap. However, in the device and method of the present invention transmitted data remains because it gives rise to keying between $s_1$ and $s_3$ and between $s_2$ and $s_4$ which are non-antipodal.

Figure 1:
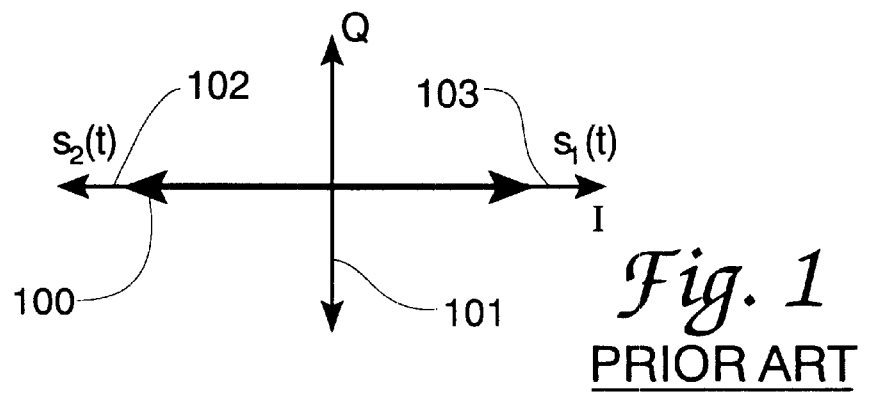
FIG. 1 shows a prior art mathematical vector relationship of antipodal signals.
Figure 2:
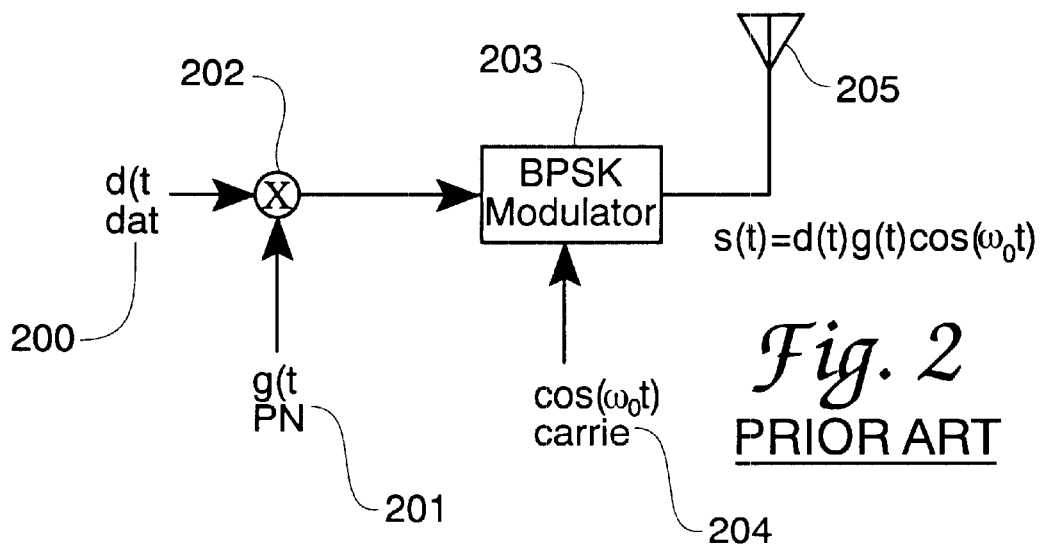
FIG. 2 shows a prior art antipodal binary phase shift keying transmitter.
Figure 3:
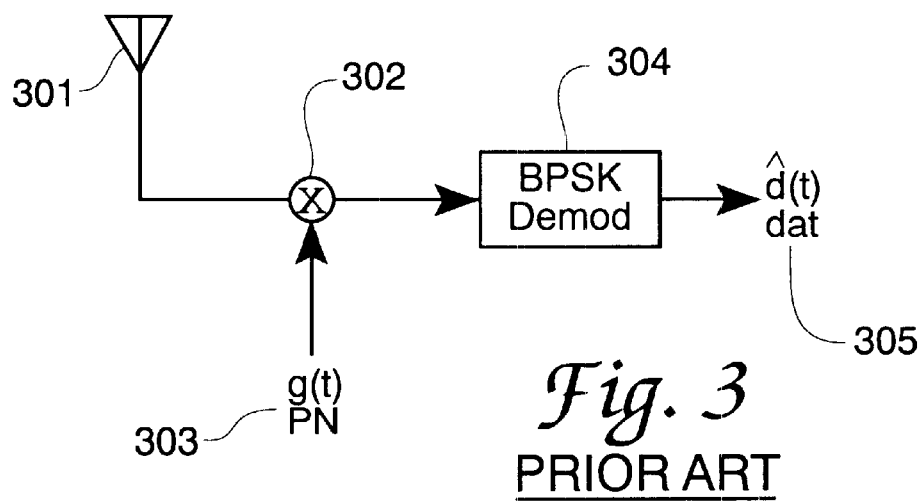
FIG. 3 shows a prior art antipodal binary phase shift keying receiver.
Figure 4:
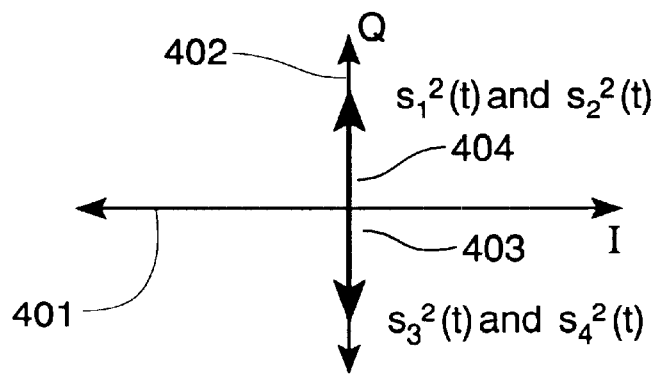
FIG. 4 shows a mathematical vector relationship of squared non-antipodal signals.

Vectorially, this is shown in FIG. 4. The inphase axis component, I, is shown along the axis at 401 and the quadature phase component, Q, is shown along the axis at 402. The signals $s_1^2$ and $s_2^2$ are represented by the bold line at 404 on the positive Q axis and signals $s_3^2$ and $s_4^2$ are represented by the bold line 403 on the negative Q axis. This illustrates that after squaring the signal, which removes the code, the data becomes antipodal.

The direct digital synthesis device may be used for modulating both antipodal signals and nonantipodal signals. Accordingly, antipodal modulation of the pseudorandom code may also be accomplished by a direct digital synthesis device.

Figure 5:
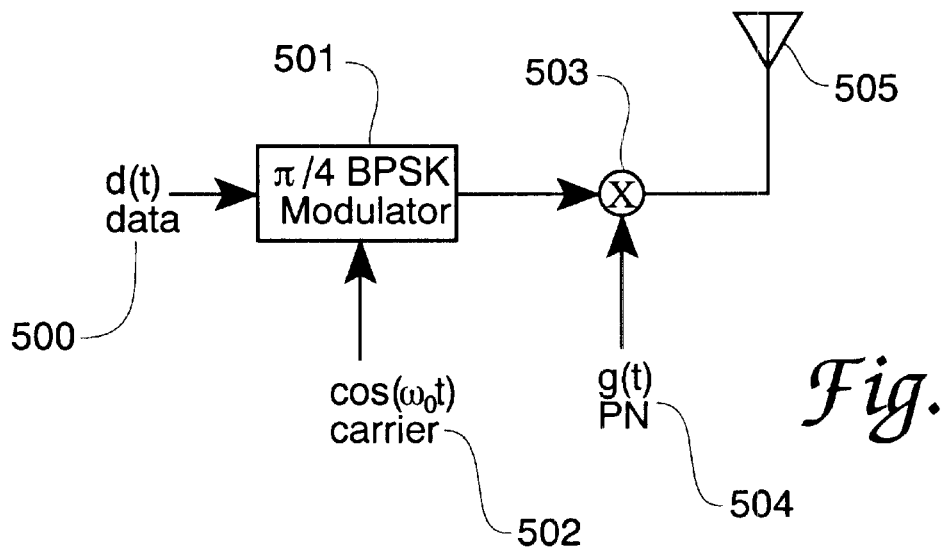
FIG. 5 shows a non-antipodal binary phase shift keying transmitter.
Figure 6:
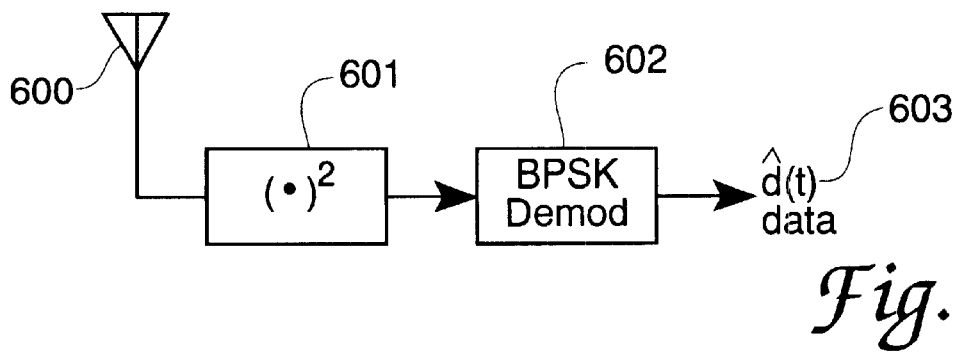
FIG. 6 shows a non-antipodal binary phase shift keying receiver.

FIGS. 5 and 6 show a possible hardware arrangement for a non-antipodal phase shift keying DSSS system. FIG. 5 shows a non-antipodal binary phase shift keying transmitter. A binary bit input data sequence is shown at 500, a non-antipodal binary phase shift keying modulator is shown at 501 and a carrier is shown at 502. The non-antipodal modulator 501 modulates the input data by phase increments of $\pi/4$ onto a carrier wave $\cos(\omega_0 t)$. The modulated data is then mixed at 503 with a antipodally modulated pseudorandom code g(t) represented at 504. The signal is then transmitted as represented at 505.

FIG. 6 shows a non-antipodal phase shift keying receiver. The signal is received at the antenna 600 and the circuit capable of performing the squaring function is represented at 601. The squaring operation performed by the receiver removes the pseudorandom code, but leaves the binary bit data sequence intact. The binary bit data sequence is then demodulated at 602. The data is then output at 603.

Figure 9:
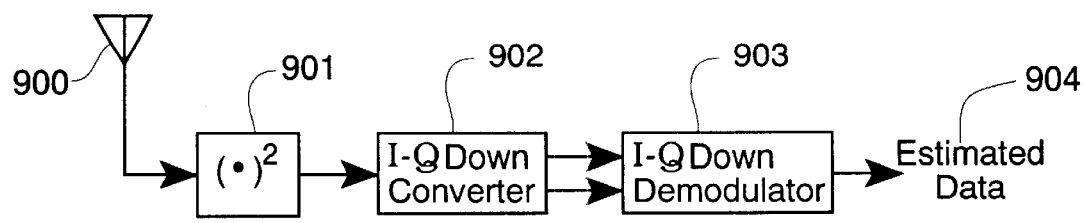
FIG. 9 shows an example of a non-antipodal spread spectrum quadature phase shift keying receiver.

An example quadrature non-antipodal phase shift keying receiver arrangement according to the invention is shown in FIG. 9. The non-antipodally modulated binary bit data signal is received at 900 and a mathematical squaring operation is performed at 901. The mathematical squaring function operation eliminates the pseudorandom code and the modulated binary bit digital data signal continues transmission through the receiver. The I-Q down converter 902 reduces the received carrier frequency to a lower frequency that can be handled easier by the demodulator while keeping the inphase and quadature components of the signal in two separate channels. The I-Q down demodulator 903 demodulates the data and the desired estimated data 904 is transmitted for use in the specific application.

The method and device of the present invention allows for a wide range of modulation capability. In theory, signal modulation could occur at phase increments of any degree and is only limited by the capabilities of the digital synthesis device performing the modulation. The criteria for determining the modulation, that is the signal phase shift or angle, depends upon the application. Simply stated, the data modulation angles, $d_i(t)$, must be chosen so that when they are doubled modulo $2\pi$, none overlap. The following provides a rule for selecting modulation angles. Consider a pair of modulation angles $d_i(t) \in \{\phi_1, \phi_2\}$ to be used in a DSSS signaling scheme. With $m(t)=0$ or $\pi$ for antipodal modulation of the pseudorandom code, the signal of Eq. 1 now becomes $$s_i(t)=(\cos\omega_0 t+d_i(t)+m(t)). \tag{15}$$

Figure 7:
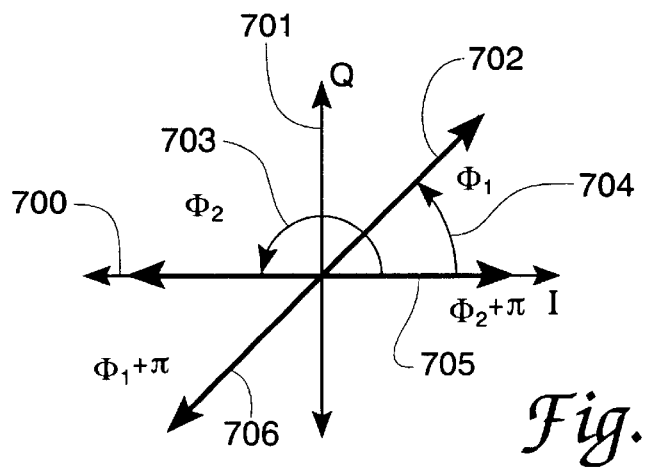
FIG. 7 shows a graphical representation of non-antipodal data modulation angles.

The signal set is shown vectorially in FIG. 7. In FIG. 7 the inphase axis I is shown at 700 and the quadature phase axis Q is shown at 701. The modulation angle $\phi_1$ is shown at 704 and the modulation angle $\phi_2$ is shown at 703 with the modulated signals $\phi_1+\pi$ and $\phi_2+\pi$ shown, respectively, at 706 and 705.

Figure 8:
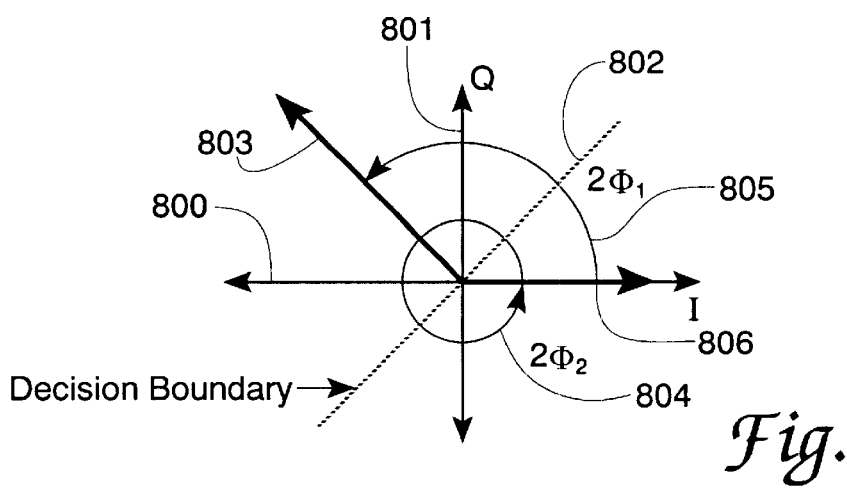
FIG. 8 shows a graphical representation of the phase angles of FIG. 7 entering a demodulator.

Following the squaring operation performed on the non-antipodally modulated signals, the modulation angles are doubled and the spreading code modulation is removed. The phases and signals entering the demodulator are shown in FIG. 8. The inphase axis, I, is shown at 800 and the quadature phase axis Q is shown at 801. The decision boundary, that is, the imaginary line that divides the space where each of the two transmitted symbols are equally spaced is shown at 802, phase angle $2\phi_1$ is shown at 805 and phase angle $2\phi_2$ is shown at 804, with the associated signals shown at 803 and 806, respectively.

If only nearest neighbor errors are considered, then the probability of error in selecting phase modulation angles is minimized by maximizing the angular separation of the signals entering the demodulator. In a binary signaling system, the maximum separation is $\pi$, or 180°. This indicates that the separation between the data modulation angles (the phases prior to entering the squarer) should be $\pi/2$. The example above used $\pm\pi/4$, however any pair of angles separated by 90° would yield the same performance. The choice of different pairs of angles only impacts the orientation of the decision boundary used by the demodulator. For higher order M-ary systems, the rule remains the same: optimal separation for the data modulation angles is $\pi/M$. For instance, the binary system based on $\pm\pi/4$ could be converted to an optimal 4-ary system by adding 0 and $\pi/2$ to the data set, i.e. $d_i(t) \in \{0, \pi/2, \pi/4, -\pi/4\}$. The signal entering the demodulator based on these angles would appear to be a standard quadature phase shift keying signal. Note that some form of quadrature demodulation must be used to recover the data.

This type of receiver, one possible arrangement being shown in FIG. 9, would be required for any system where the decision boundary does not lie along the quadrature axis in the phase plane. For binary systems where the decision boundary does lie along the quadrature axis, $d_i(t) \in \{0, \pi/2\}$ for example, a simple integrate and compare-to-zero demodulator may be used.

The theoretical performance of the system is most easily understood as follows. Consider an optimal binary modulation scheme in the presence of additive white Gaussian noise (AWGN)

$$r(t)=A\cos(\omega_0 t+d_i(t)+m(t))+n(t), \tag{16}$$

where A is a scale factor for power, $\omega_0$ is the carrier frequency, $d_i(t) \in \{0, \pi/2\}$, and m(t) is $\pm\pi$. When the received signal r(t) is squared we get the result $$r^2(t) = A^2/2 + A^2/2\cos(2\omega_0 t + 2d_i(t) + 2m(t)) + n^2(t) + \tag{17}$$
$$2An(t)\cos(\omega_0 t + d_i(t) + m(t)).$$

This signal is then down converted by $\cos(2\omega_0 t)$ resulting in $$r_d^2(t) = A^2/4\cos(2d_i(t)) + A^2/2\cos(2\omega_0) + \tag{18}$$
$$A^2/4\cos(4\omega_0 + 2d_i(t)) + n^2(t)\cos(2\omega_0) +$$
$$An(t)[\cos(3\omega_0 t + d_i(t) + m(t)) +$$
$$\cos(-\omega_0 t + d_i(t) + m(t))].$$

Note that the 2m(t) argument has been removed since it is equal to $\pm 2\pi$ and thus has no effect on the signal. Next, this signal is lowpass filtered to remove content at frequencies above $R_d$, the data rate. There are now three terms which contribute to the noise: the squared noise term $n^2(t)$ modulated at $2\omega_0$, and the scaled noise terms An(t) at the carrier frequency and its third harmonic. The tone at $2\omega_0$ and the narrowband signal at $4\omega_0$ are assumed to be removed by the filter.

The interference due to the noise can be analyzed by examining the power spectral density of the signal entering the demodulator. First consider the autocorrelation of the signal entering the demodulator, $$R(\tau)=E\{r_d^2(t)r_d^2(t-\tau)\}, \tag{19}$$

where $E\{.\}$ is the expected value operation. Expanding $R(\tau)$ yields 36 terms, but with the assumptions that the noise and transmitted signal are uncorrelated and that the expected value of $\cos(n\omega_0 t)$ is zero, then $R(\tau)$ reduces to $$R(\tau) = E\left\{\frac{A^4}{8}\cos(2\omega_0\tau) + \frac{A^2}{4}n^2(t-\tau)\cos(2\omega_0\tau) + \right. \tag{20}$$
$$\frac{A^4}{16}\cos(2d_i(t))\cos(2d_i(t-\tau)) +$$
$$\frac{A^4}{32}\cos(4\omega_0\tau + 2d_i(t-\tau) - 2d_i(t)) +$$
$$\frac{A^4}{4}n^2(t)\cos(2\omega_0\tau) + \frac{1}{2}n^2(t)n^2(t-\tau)\cos(2\omega_0\tau) +$$
$$\frac{A^2}{2}n(t)n(t-\tau)\cos(3\omega_0\tau + m(t) - m(t-\tau) + d_i(t) - d_i(t-\tau)) +$$
$$\left.\frac{A^2}{2}n(t)n(t-\tau)\cos(\omega_0\tau - m(t) + m(t-\tau) - d_i(t) + d_i(t-\tau))\right\}.$$

Taking the expected value over t results in $$R(\tau) = \frac{A^4}{8}\cos(2\omega_0\tau) + \frac{A^2}{4}R_{nn}(0)\cos(2\omega_0\tau) + \frac{A^4}{16}R_{dd}(\tau) + \qquad (21)$$
$$\frac{A^4}{32}\cos(4\omega_0\tau)R_{dd}(\tau) + \frac{A^2}{4}R_{nn}(0)\cos(2\omega_0\tau) +$$
$$\frac{1}{2}R_{nn}^2(0)\cos(2\omega_0\tau) + R_{nn}^2(0)\partial(\tau) + A^2 R_{nn}(0)\partial(\tau),$$

where $R_{nn}(\tau)$ is the autocorrelation of the AWGN, and $R_{dd}(\tau)$ is the autocorrelation of the squared baseband data signal. Taking the Fourier transform of the $R(\tau)$ gives the resulting PSD lower spectral density as $$S(\omega) = \frac{A^4}{8}S_d(\omega) + R_{nn}^2(0) + A^2 R_{nn}(0) + \frac{A^4}{32}S_d(\omega \pm 4\omega_0) + \qquad (22)$$
$$\partial(\pm 2\omega_0)\left[\frac{A^4}{16} + \frac{A^2}{4}R_{nn}(0) + \frac{1}{4}R_{nn}^2(0)\right],$$

where $S_d(\omega)$ is the PSD of the squared baseband data signal. The spectral components at $2\omega_0$ and the image of the data at $4\omega_0$ are removed by lowpass filtering. The components of the filtered PSD can be factored into the input (prior to squaring) and output (ust before demodulation) signal-to-noise ratios giving $$\frac{SNR_{out}}{SNR_{in}} = \frac{A^2}{8(R_{nn}(0) + A^2)}, \qquad (23)$$

which indicates a 9 dB loss in SNR for signals whose power is significantly larger than the variance of the additive white gaussian noise. This 9 dB loss is the price incurred is for including the squaring operation which removes the synchronization and reference code generation requirements at the receiver.

It is understood that certain modifications to the invention as described may be made, as might occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

What is claimed is:

1. A despreading simplified, receiver circuitry-minimized direct sequence spread spectrum transceiver device comprising:
   a binary bit data interfacing circuit;
   a binary bit pseuodrandom code generating circuit;
   a preprogrammable digital synthesis non-antipodal phase modulation device communicating with said binary bit data interfacing circuit and outputting a binary bit data sequence of preselected frequency;
   a binary bit pseudorandom code and preselected frequency binary bit data sequence mixing device, an output of said mixing device modulated onto a spread spectrum carrier wave;
   an operator determinative frequency translating circuit communicating with said mixing device;
   a mathematical squaring function characterized spread spectrum receiving circuit, said receiving circuit receiving output from said operator determinative frequency translating circuit and performing a mathematical squaring function thereon, said squaring function eliminating said binary bit psuedorandom code and preserving said binary bit data sequence; and
   said mathematical squaring function capability receiving circuit including an operator determinative binary bit data demodulating circuit.

2. The despreading simplified, receiver circuitry minimized spread spectrum transceiver device of claim 1 wherein said preprogrammable digital synthesis non-antipodal phase modulation device includes an incremental resolution digital synthesis phase modulation device.

3. The despreading simplified, receiver circuitry minimized spread spectrum transceiver device of claim 1 wherein said preprogrammable digital synthesis non-antipodal modulation device includes non-antipodal M-ary phase modulation preprogrammable digital synthesis modulating device connected to an output of said binary bit data interfacing circuit.

4. The despreading simplified, receiver circuitry minimized spread spectrum transceiver device of claim 1 wherein said preprogrammable digital synthesis non-antipodal modulation device includes a non-antipodal quadrature phase modulation device.

5. The despreading simplified, receiver circuitry minimized spread spectrum transceiver device of claim 1 wherein said spread spectrum carrier wave comprises a cosine wave.

6. The despreading simplified, receiver circuitry minimized spread spectrum transceiver device of claim 1 wherein said preprogrammable digital synthesis non-antipodal modulation device is connected with said binary bit pseudorandom code a generating circuit and outputs an antipodally modulated binary bit pseudorandom code therefrom.

7. A direct sequence spread spectrum transceiver device comprising:
   a non-antipodal phase shift keying transmitter comprising:
      a binary bit data sequence interfacing circuit;
      a pseudorandom code generating circuit;
      a non-antipodal phase modulator communicating with said binary bit data sequence interfacing circuit and modulating said data sequence therefrom in increments of $\pi/4$,
      a pseudorandom code and binary bit data sequence mixing device communicating with outputs from said pseudorandom code generating circuit and said binary bit data sequence interfacing circuit;
      a spread spectrum cosine carrier wave interfacing circuit, outputs of said pseudorandom code and binary bit data sequence mixing device modulated thereon;
      a transmitting device for transmitting output from said spread spectrum cosine carrier wave;
   a non-antipodal phase shift keying receiver comprising:
      a transmitting device output receiving antenna;
      a mathematical squaring function electronic circuit performing a mathematical squaring on an output of said transmitting device output receiving antenna eliminating pesueorandom code therefrom; and
      a binary bit data sequence demodulating circuit.

8. The direct sequence spread spectrum transceiver device of claim 7 wherein said non-antipodal binary bit phase modulator outputs data modulated by phase increments of less than $\pi/4$.

9. The direct sequence spread spectrum transceiver device of claim 7 wherein said non-antipodal binary bit phase modulator outputs data modulated by M-ary phase increments.

10. The direct sequence spread spectrum transceiver device of claim 7 wherein said non-antipodal phase modulator is connected with said pseudorandom code generating circuit outputting an antipodally modulated binary bit pseudorandom code therefrom.

11. A despreading simplified, receiver circuitry minimized direct sequence spread spectrum transceiver method comprising the steps of:

transmitting a binary bit data sequence;

generating an pseuodrandom code;

modulating onto a carrier wave a mixed output of said transmitting step and said generating step, said pseudorandom code antipodally phase modulated thereon and said binary bit data sequence non-antipodally phase modulated thereon;

operator determinative frequency translating of output from said modulating step;

transmitting an output from said operator determinative frequency translating step;

receiving an output from said transmitting step using a receiving antenna;

performing a mathematical squaring on an output of said receiving step, said mathematical squaring eliminating said psuedorandom code and preserving said binary bit data sequence; and demodulating said binary bit data sequence from said performing step.

12. The despreading simplified, receiver circuitry minimized direct sequence spread spectrum transceiver method of claim 11 wherein said modulating step further includes the step of modulating onto a carrier cosine wave.

13. The despreading simplified, receiver circuitry minimized direct sequence spread spectrum transceiver method of claim 11, wherein said modulating step further includes modulating onto a carrier wave a mixed output of said transmitting step and said generating step, said pseudorandom code antipodally phase modulated in increments of $\pi/4$ thereon.

14. The despreading simplified, receiver circuitry minimized direct sequence spread spectrum transceiver method of claim 11, wherein said modulating step further includes modulating onto a carrier wave a mixed output of said transmitting step and said generating step, said pseudorandom code antipodally phase modulated in M-ary phase increments thereon.

* * * * *